United States Patent Office 2,798,869
Patented July 9, 1957

2,798,869

PYRIDAZONES AND PROCESS FOR MANUFACTURE THEREOF

Jean Druey, Riehen, Albrecht Hueni, Basel, Beat Heinrich Ringier, Riehen, and Alexander Staehelin, Basel, Switzerland, assignors to Ciba Pharmaceutical Products, Inc., Summit, N. J.

No Drawing. Application June 18, 1953, Serial No. 362,678

Claims priority, application Switzerland June 20, 1952

8 Claims. (Cl. 260—247.5)

This invention relates the the manufacture of 6-amino-2-aryl-pyridazone-(3) compounds, more particularly those in which aryl indicates an at most di-nuclear aromatic residue, for example, naphthyl, and primarily a phenyl residue, and amino indicates an unsubstituted amino group or a hydrocarbon-substituted amino group such as an alkyl-amino group e. g., methyl-, ethyl-, propyl- or butylamino-group; a dialkylamino group, e. g., dimethyl- or diethylamino- or an alkyleneamino group, e. g., piperidino, pyrrolidino, or a morpholino group, and salts thereof. These compounds may be further substituted, as e. g., in the aryl nucleus by a lower alkyl group e. g. methyl, or a nitro or amino group e. g. a free amino or a dimethylamino group or a halogen atom for example chlorine and in the pyridazone nucleus by a lower alkyl group, e. g. methyl, or any of the aforesaid amino groups.

The new compounds possess valuable pharmacological properties and are intended for use as medicaments or as intermediate products. Thus they exhibit an antipyretic and analgesic effect, and are useful as antipyretics and analgesics. In this connection there have proved of especial value 6-mono- or-dimethylamino-2-phenyl-pyridazone-(3) compounds, primarily 6-dimethylamino-2-phenyl-pyridazone-(3) of the formula

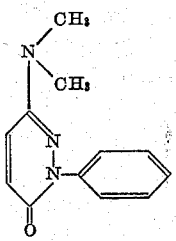

The new compounds are obtained when in 2-aryl-pyridazone-(3) compounds, which contain in 6-position a halogen atom, such as chlorine or bromine, this halogen atom is exchanged for an amino group.

Thus pyridazones of the specified type which contain in 6-position a chlorine or bromine atom, can be reacted with ammonia or amines.

When the pyridazone used a starting material contains a further substituent exchangeable for an amino group, this substituent can be so exchanged simultaneously with the formation of an amino group in 6-position. Accordingly, it is possible to convert e. g., 2-aryl-4:6-dichloro-pyridazone-(3) with diamethylamine into the corresponding 4:6-bis-dimethylamino-2-aryl-pyridazone-(3). When the resulting 6-amino-2-aryl-pyridazones contains a nitro group as substituent on the aryl radical, such nitro group can be converted into an amino group, e. g. a free amino or a dimethylamino group.

The reactions can be carried out in the presence or absence of diluents and/or condensing agents and/or catalysts with or without the application of pressure.

The starting materials used in the process of the invention, for example, the 2-aryl-6-halogen-pyridazone-(3) compounds can be obtained according to the process of our U. S. application Serial No. 362,684, filed June 18, 1953, by treating 2-aryl-6-hydroxy-pyridazone-(3) compounds or their tautomeric forms with halogenating agents. Among the latter the halides of phosphoric acid are particularly suitable, such as phosphorus oxychloride, phosphorus pentachloride and phosphorus pentabromide. The reaction is preferably carried out at elevated temperature, that is to say at 100° C. or above.

The 2-aryl-6-hydroxy-pyridazone-(3) compounds can, in general, be prepared by reacting arylhydrazines with maleic anhydride or substituted maleic anhydrides, e. g. chloro-maleic anhydride or citraconic anhydride.

Depending on the method of working, the new compounds are obtained in the form of their free bases or salts. From the latter, by treating with an alkali, there can be obtained the free bases. The free bases can be converted into therapeutically applicable and nontoxic salts by reaction with acids, appropriate for this purpose, especially strong inorganic or organic acids, such as hydrohalic acids, e. g., hydrochloric, hydrobromic, sulfuric, phosphoric, nitric, tartaric, citric, acetic, propionic, oxalic, malic, methane, sulfuric, salicylic and the like acids.

The following examples illustrate the invention, the relation between parts by weight and parts by volume being the same as that between gram and cubic centimeter:

Example 1

57 parts by weight of 2-phenyl-6-chloro-pyridazone-(3) are heated to 150° C. for 10 hours with 140 parts by weight of morpholine. The reaction mixture is dissolved in the hot in 630 parts by volume of 2 N-hydrochloric acid and, after cooling, filtered with suction. The residue is dissolved in hot ethanol of 96 percent strength, the solution rendered alkaline while still hot by the addition of concentrated aqueous ammonia and the product filtered over animal charcoal and treated with water, whereupon, on cooling, 6-morpholino-2-phenyl-pyridazone-(3) crystallises out and is filtered off. It possesses the formula

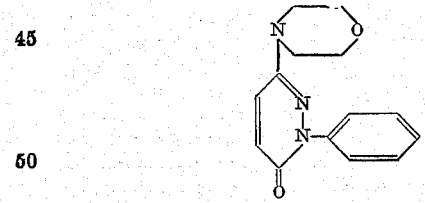

and, after recrystallization from a mixture of ethanol and water, melts at 181–183° C.

The 2-phenyl-6-chloro-pyridazone-(3) used as starting material can be prepared in the following manner:

235 parts by weight of maleic anhydride are dissolved in 2000 parts by volume of glacial acetic acid and the solution boiled under reflux for 3 hours with a solution of 270 parts by weight of phenyl-hydrazine in 500 parts by volume of glacial acetic acid. The hot solution is then poured, with stirring, into 700 parts by volume of water whereby crystallisation takes place. The cooled mixture is filtered with suction and the residue washed with water and for purification dissolved in N-sodium carbonate solution and, after filtration, reprecipitated with 2 N-hydrochloric acid. The precipitate is filtered with suction, washed with water and dried. The 2-phenyl-6-hydroxy-pyridazone-(3) thus obtained melts at 272–274° C. 100 parts by weight thereof are heated on the boiling water bath for 1 hour with 750 parts by volume of phosphorus oxychloride, the solution carefully poured with stirring on to 5500 parts by weight of ice and after standing for an hour in the cold, the precipitate filtered with suction. It is washed with water and recrystallised from water. The 2-phenyl-6-chloro-pyridazone-(3) thus obtained of the formula

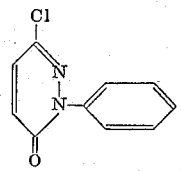

melts at 116–118° C.

Example 2

12 parts by weight of 2-(para-chlorophenyl)-6-chloro-pyridazone-(3) are heated to 150° C. for 10 hours with 25 parts by weight of morpholine. The reaction mixture is thereupon boiled with excess of 2 N-hydrochloric acid and the insoluble portion filtered off with suction. It is dissolved in hot ethanol of 96 percent strength, the solution rendered alkaline with concentrated aqueous ammonia, then filtered hot over animal charcoal and water added. On cooling, the 6-moropholino-2-(para-chlorophenyl)-pyridazone-(3) of the formula

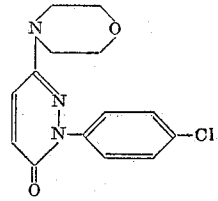

crystallises out and it is filtered with suction and after recrystallisation from a mixture of ethanol and water melts at 164–166° C.

The 2-(para-chlorophenyl)-6 - chloro - pyridazone-(3) used as starting material can be prepared in the following manner:

66 parts by weight of para-chlorophenyl hydrazine in 122 parts by volume of glacial acetic acid are added to a solution of 76 parts by weight of maleic anhydride in 670 parts by volume of glacial acetic acid and the mixture is heated to boiling for 3 hours under reflux. To the hot solution 240 parts by volume of water are added and the whole is allowed to crystallise with cooling. The crystallisate is filtered with suction, washed with water and dried. 49 parts by weight of the 2-para-chlorophenyl-6-hydroxypyridazone-(3) of the melting point 280–282° C. thus obtained, are heated for one hour on the boiling water bath with 300 parts by volume of phosphorus oxychloride. The solution is carefully poured on ice with stirring and after standing for some time in the cold the precipitate formed is filtered with suction, washed with water and dried. The 2-(para-chlorophenyl)-6-chloro-pyridazone-(3) thus obtained, of the formula

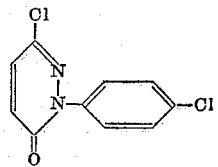

after recrystallisation from a mixture of benzene and petrol ether, melts at 138–140° C.

Example 3

41.2 parts by weight of 2-phenyl-6-chloro-pyridazone-(3) are heated for 6 hours to 180° C. in a closed vessel with 120 parts by volume of piperidine. After cooling, the content of the vessel is filtered with suction, the residue washed with petrol ether and dissolved in hot ethanol of 96 percent strength, the solution is rendered alkaline by addition of concentrated aqueous ammonia and water is added to it. In the cold, the 6-piperidino-2-phenyl-pyridazone-(3) of the formula

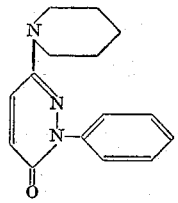

crystallises and is filtered with suction. After repeated recrystallisation from a mixture of benzene and petrol ether and a mixture of alcohol and water, with the addition of animal charcoal, it melts at 111–113° C.

Example 4

41.2 parts by weight of 2-phenyl-6-chloro-pyridazone-(3) are heated with 60 parts by weight of pyrrolidine in a closed vessel for 6 hours to 150–155° C. The content of the vessel is digested in the hot in an excess of 2 N-hydrochloric acid and after cooling, the insoluble material is filtered with suction and washed with water. It is dissolved in hot ethanol of 96 percent strength, the solution rendered alkaline with concentrated aqueous ammonia and then filtered hot over animal charcoal. After the addition of water, the 6-pyrrolidino-2-phenyl-pyridazone-(3) of the formula

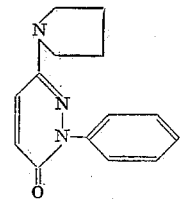

crystallises in the cold. It is filtered with suction and recrystallised from a mixture of ethanol and water. Melting point 161–163° C.

Example 5

10.3 parts by weight of 2-phenyl-6-chloro-pyridazone-(3) are heated to 150–155° C. for 6 hours in a closed vessel with a 31.5 percent ethyl alcoholic dimethylamine solution containing 20 parts by weight of dimethylamine. After cooling, the product which has crystallised is filtered with suction and recrystallised several times from a mixture of benzene and petrol ether. The 6-dimethyl-amino-2-phenyl-pyridazone-(3) of the formula

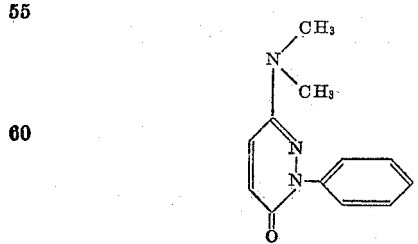

thus obtained melts at 130–132° C.

Example 6

12 parts by weight of 2-para-chlorophenyl-6-chloro-pyridazone-(3) are heated to 150–155° C. for 6 hours in a closed vessel with a 31.5 percent ethyl alcoholic dimethylamine solution containing 20 parts by weight of dimethylamine. After cooling the content of the vessel is filtered with suction and the residue recrystallized several times from benzene with the application of animal charcoal. The 6-dimethylamino-2-para-chlorophenyl-pyridazone-(3) of the formula

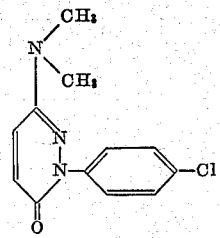

melts at 174–176° C.

Example 7

8.2 parts by weight of 2-phenyl-6-chloro-pyridazone-(3) are heated in a closed vessel for 10 hours to 140–150° C. with 30 parts by volume of n-butylamine. The excess of butylamine is thereupon distilled off under vacuum at 90° C. and the residue dissolved in hot ethanol of 96 percent strength. The hot solution is rendered alkaline with concentrated aqueous ammonia, treated with much water and extracted with ether. After drying the ether solution which has been separated, and evaporation of the ether, a residue remains which after drying under vacuum at 90° C. is recrystallised several times from a mixture of benzene and petrol ether with the addition of animal charcoal. The 6-n-butylamino-2-phenyl-pyridazone-(3) of the formula

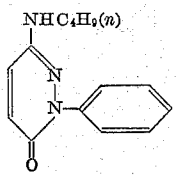

thus obtained melts at 126–128° C.

Example 8

4.2 parts by weight of 2-phenyl-4 (or 5)-methyl-6-chloro-pyridazone-(3) are heated in a closed vessel with 50 parts by volume of a 30 percent ethyl alcoholic dimethylamine solution for 6 hours to 190–195° C. The more volatile fractions are driven off under vacuum on a boiling water bath and the residue is recrystallised several times from cyclohexane with the application of animal charcoal. The 6-dimethylamino-2-phenyl-4-(or 5)-methyl-pyridazone-(3) of the formula

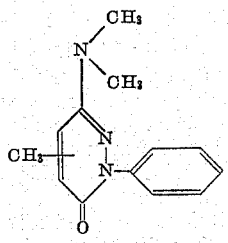

thus obtained melts at 91–92° C.

The 2-phenyl-4 (or 5)-methyl-6-chloro-pyridazone-(3) used as starting material can be obtained by the following procedure:

215 parts by weight of citraconic acid in 1900 parts by volume of glacial acetic acid are boiled for 3 hours with 207 parts by weight of phenylhydrazine. 620 parts by volume of water are then slowly added while stirring the hot solution, after which the whole is allowed to cool. The reaction mass is suction-filtered. The residue is a mixture of 2-phenyl-methyl-6-hydroxy-pyridazone-(3), the methyl group of which stands in one of the positions 4 and 5, and the N-anilino-citraconic acid imide which is insoluble in sodium hydroxide solution. For separation, 600 parts by volume of 2 N-sodium hydroxide solution are admixed, the undissolved imide is removed by filtration and the pyridazine reprecipitated with hydrochloric acid. The compound is purified by dissolving it in 2400 parts by volume of water containing 132 parts by weight of sodium bicarbonate, after which another small quantity of the imide can be separated by filtration. The filtrate is acidified with hydrochloric acid and the separated precipitate recrystallized from 800 parts by volume of ethanol. The resulting 2-phenyl-methyl-6-hydroxy-pyridazone-(3), the methyl group of which stands in one of the positions 4 and 5, melts at 225–227° C.

3 parts by weight of 2-phenyl-4 (or 5)-methyl-6-hydroxy-pyridazone-(3) are heated for some time on the boiling water bath with 15 parts by volume of phosphorus oxychloride. The phosphorus oxychloride is thereupon considerably distilled off and the residue poured on ice. After prolonged standing, the solid fraction is filtered with suction, washed with water and recrystallised several times from absolute ethanol. The 2-phenyl-4 (or 5)-methyl-6-chloro-pyridazone-(3) of the formula

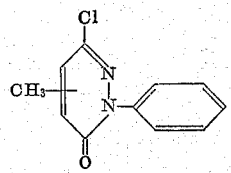

thus obtained melts at 136–137° C.

Example 9

20.6 parts by weight of 2-phenyl-6-chloro-pyridazone-(3) are heated for 6 hours to 150–155° C. with 60 parts by volume of a 25 percent ethylalcoholic methylamine solution in a closed vessel. The ethyl alcohol is then evaporated under reduced pressure and the residue recrystallised several times from benzene with the use of animal charcoal. There is thus obtained the 6-methylamino-2-phenyl-pyridazone-(3) of the formula

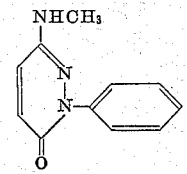

which melts at 145–147° C.

Example 10

5 parts by weight of 2-phenyl-6-chloro-pyridazone-(3) are heated for 10 hours to 155–165° C. with 20 parts by volume of diethylamine and 1 part by weight of triethylamine in a sealed tube. The reaction mixture is filtered, the filtered solution evaporated to dryness, the residue dissolved in acetone and chromatographed over alumina, and the purified acetone solution evaporated to dryness. The residue is taken up in 4 N-hydrochloric acid, the mixture extracted with ether, the acid aqueous solution rendered alkaline with caustic soda solution, and then extracted with benzene. After drying and evaporation of the benzene the residue is extracted several times with ligroin and the ligroin extracts purified with animal charcoal. On cooling, the 6-diethylamino-2-phenyl-pyridazone-(3) of the formula

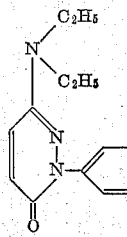

crystallises. It melts at 71–73° C.

Example 11

6 parts by weight of 2-(para-nitrophenyl)-6-chloro-pyridazone-(3) are heated for 10 hours to 165–175° C. with 10 parts by volume of a 7 N-ethylalcoholic dimethylamine solution, 40 parts by volume of absolute ethanol and 2 parts by volume of triethylamine in a sealed tube. After cooling, the reaction mass is suction-filtered.

The residue is recrystallised from a mixture of glacial acetic acid and water. The resulting 6-dimethylamino-2-(para-nitrophenyl)-pyridazone-(3) of the formula

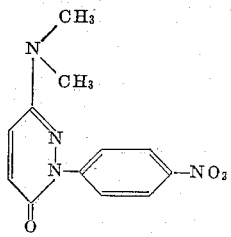

melts at 210–212° C.

The 2-(para-nitrophenyl)-6-chloro-pyridazone-(3) used as starting material can be prepared as follows:

40 parts of 2-phenyl-6-hydroxy-pyridazone-(3) are stirred with 80 parts by volume of concentrated nitric acid, and 80 parts by volume of concentrated sulfuric acid slowly admixed at 0–5° C. in the course of 60 minutes. The mixture is stirred for another two hours at 0–10° C. and then gradually admixed with 320 parts by volume of water, the temperature rising to 35° C. After cooling, the pale yellow nitro-compound is suction-filtered. The crude product is taken up in soda solution, the solution filtered with the addition of animal charcoal and the 2-(para-nitrophenyl)-6-hydroxy-pyridazone-(3) precipitated with 2 N-hydrochloric acid, then filtered with suction and dried. It melts at 289–291° C.

10 parts by weight of this compound are heated on the boiling water bath for 2½ hours with 25 parts by volume of phosphorus oxychloride. The mixture is then poured into water at 40–50° C., ice being added to maintain this temperature. The 2-(para-nitro-phenyl)-6-chloro-pyridazone-(3) crystallises out. It can be recrystallised from ethyl acetate and then melts at 195–196° C.

Example 12

15 parts by weight of 2-naphthyl-(2')-6-chloro-pyridazone-(3) are heated for 6 hours to 155–165° C. with 25 parts by volume of a 7 N-ethylalcoholic dimethylamine solution, 100 parts by volume of absolute ethanol and 5 parts by volume of triethylamine in a sealed tube. The contents of the tube are concentrated to one half their bulk by evaporation under reduced pressure, the solution cooled and the pale yellow residue suction-filtered and dried. It consists of 6-dimethylamino-2-naphthyl-(2')-pyridazone-(3) of the formula

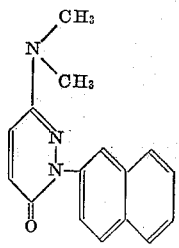

and after recrystallisation from a mixture of ethanol and water melts at 102–104° C.

The 2-naphthyl-(2')-6-chloro-pyridazone-(3) used as starting material can be prepared as follows:

10.3 parts by weight of β-naphthylhydrazine are dissolved in 50 parts by volume of glacial acetic acid and mixed with a solution of 6.4 parts by weight of maleic anhydride in 25 parts by volume of glacial acetic acid. The mixture is refluxed for 1 hour, as a result of which solution at first occurs. After some time, crystallisation sets in. The whole is allowed to cool and the yellow-white precipitate filtered off with suction. The 2-naphthyl-(2')-6-hydroxy-pyridazone-(3) thus obtained melts at 268–270° C.

6.9 parts by weight of this compound in 15 parts by volume of phosphorus oxychloride are heated on the water bath for 1 hour to 95° C., dissolution occurring. The solution is then cautiously poured into water during which operation the temperature is maintained at 40–50° C. by the addition of ice. The whole is then allowed to stand for some time after which the pale grey residue is filtered off with suction. The resulting 2-naphthyl-(2')-6-chloro-pyridazone-(3) crystallizes from alcohol in the form of long white needles which melt at 155–156° C.

Example 13

10 parts by weight of 2-naphthyl-(1')-6-chloropyridazone-(3) are heated to 155–165° C. for 10 hours with 17 parts by volume of a 7 N-ethylalcoholic dimethylamine solution, 60 parts by volume of absolute ethanol and 2 parts by volume of triethylamine in a sealed tube. The contents of the tube are cooled and the brown-yellow residue suction-filtered and dried. The 6-dimethylamino-2-naphthyl-(1')-pyridazone-(3) of the formula

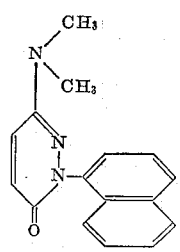

thus obtained melts, after recrystallization from a mixture of ethanol and water, at 192–194° C.

The 2-naphthyl-(1')-6-chloro-pyridazone-(3) used as starting material can be prepared as follows:

16.4 parts by weight of α-naphthylhydrazine and 80 parts by weight of glacial acetic acid are dissolved together and a solution of 10.4 parts by weight of maleic anhydride in 40 parts by volume of glacial acetic acid added. The mixture is refluxed for 3 hours and, after cooling, poured into 40 parts by volume of water while stirring. A yellowish product crystallises. The 2-naphthyl-(1')-6-hydroxy-pyridazone-(3) so obtained melts at 283–285° C. (with decomposition).

8.2 parts by weight of this compound and 20 parts by volume of phosphorus oxychloride are heated for 1 hour on the boiling water bath. The solution is poured into 40 parts by volume of lukewarm water (40–50° C.) and the temperature maintained at 40–50° C. by the addition of ice. A brown resin is formed which slowly decays. The brown residue is filtered off with suction and boiled with water, then the mixture is filtered and the filtrate allowed to stand for several hours for crystallization to occur.

The white product thus obtained is the 6-chloro-2-naphthyl-(1')-pyridazone-(3). It melts at 126–128° C.

Example 14

50 parts by weight of 2-phenyl-6-bromo-pyridazone-(3) are heated for 10 hours to 155–165° C. with 250 parts by volume of a concentrated aqueous ammonia solution, 250 parts by volume of water and 1 part by volume of copper powder in an autoclave. The copper powder is separated and the solution extracted by agitating it several times with chloroform. The combined chloroform extracts are evaporated and the residue triturated with ether. The 6-amino-2-phenyl-pyridazone-(3) of the formula

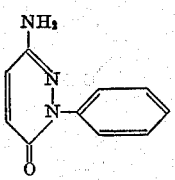

thus obtained melts at 149–151° C. By treatment with ethylalcoholic hydrochloric acid the free base can be converted into the hydrochloride of melting point 170–171° C.

The 2-phenyl-6-bromo-pyridazone-(3) used as starting material can be prepared as follows:

5 parts by weight of 2-phenyl-6-oxy-pyridazone-(3) are mixed with 12 parts by weight of phosphorus pentabromide and heated to 125–130° C. in an oil bath. The reaction mixture is poured into 50 parts by volume of water, the excess of phosphorus pentabromide decomposing. The whole is allowed to stand for 15 hours, then suction-filtered and the resulting grey-brown product washed with water and dried under reduced pressure. For purification it is dissolved in hot benzene. Petroleum ether is mixed with the solution until a flasky product precipitates. The benzene-petroleum ether solution is filtered and purified with animal charcoal and a further quantity of petroleum ether added to cause the 2-phenyl-6-bromo-pyridazone-(3) to crystallise. The product melts at 122–124° C.

*Example 15*

10 parts by weight of 2-phenyl-5:6-dichloropyridazone-(3) are heated for 2 days to 200° C. with 40 parts by volume of piperidine in a sealed tube. The contents of the tube are then evaporated to dryness and the residue extracted by agitation with ether and water, the organic layer is dried wih potash, the ether evaporated, and the residue recrystallised, first from cyclohexane, then from ethanol.

The resulting 5,6-bis-piperidino-2-phenyl-pyridazone-(3) of the formula

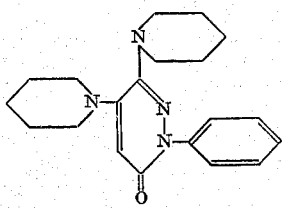

melts at 170–171° C.

The 2-phenyl-5:6-dichloropyridazone-(3) used as starting material can be prepared as follows:

400 parts by weight of chloromaleic anhydride are refluxed for 3 hours with 311 parts by volume of phenylhydrazine and 2200 parts by volume of glacial acetic acid. The whole is allowed to stand for 15 hours at 20° C., the precipitate removed by filtration and washed with glacial acetic acid. It is purified by dissolving it in dilute caustic soda solution, filtering and precipitating it with dilute hydrochloric acid, and crystallised from glacial acetic acid. The 2-phenyl-5-chloro-6-hydroxy-pyridazone-(3) thus obtained melts at 270° C. with decomposition.

85 parts by weight of this compound are heated with 680 parts by volume of phosphorus oxychloride for 1 hour to 100° C. The solution is mixed with ice-cold dilute caustic soda solution and extracted by agitation with ether. After drying over potash, the ether is evaporated and the residue recrystallised from cyclohexane. The resulting 2-phenyl-5,6-dichloro-pyridazone-(3) melts at 138° C.

*Example 16*

11 parts by weight of 2-phenyl-4,6-dichloro-pyridazone-(3) are heated for 3 days to 180° C. with 200 parts by volume of 35 percent ethyl alcoholic solution of dimethylamine in an autoclave. The reaction mass is evaporated to dryness, the residue extracted by agitation with ether and water, and the ethereal solution treated with dilute hydrochloric acid. The hydrochloric acid solution is rendered alkaline and extracted by shaking with ether. The ethereal extract is dried, the ether evaporated, and the residue recrystallised from isopropyl ether. There is thus obtained 4,6-bis-dimethylamino-2-phenylpyridazone-(3) corresponding to the formula

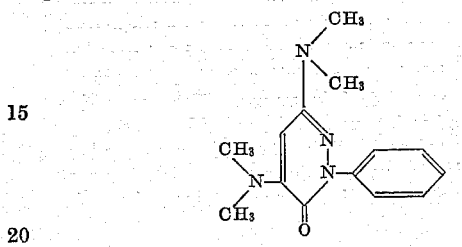

It melts at 83° C.

The 2-phenyl-4,6-dichloropyridazone-(3) used as starting material can be prepared as follows:

16 parts by weight of 2-phenyl-6-hydroxy-pyridazinone-(3) are triturated with 120 parts by weight of phosphorus pentachloride and gradually heated to 130–140° C. and the mixture is maintained at that temperature for 10 minutes. 160 parts by volume of phosphorus oxychloride are then added and the whole heated for 10 minutes at an oil bath temperature of 110° C. The solution is then mixed with a dilute caustic soda solution containing ice and extracted with ether. The ethereal extract is dried over potash and evaporated to dryness. The residue is recrystallised from a mixture of cyclohexane and methanol in the ratio 10:1, then with a mixture of the same substances in the ratio 1:2 and finally from methanol. The 2-phenyl-4,6-dichloro-pyridazone-(3) thus obtained melts at 111–112° C.

*Example 17*

10 parts by weight of 2-(para-tolyl)-6-chloro-pyridazone-(3) are heated to 150–160° C. for 6 hours with 40 parts by volume of a 35 percent ethylalcoholic solution of dimethylamine in a closed vessel. The reaction mass is then evaporated to dryness and the residue extracted with ether and water, the ethereal extract is dried with potash and evaporated to dryness, and the residue is recrystallized from a mixture of benzene and cyclohexane.

The resulting 6-dimethylamino-2-(para-tolyl)-pyridazone-(3) of the formula

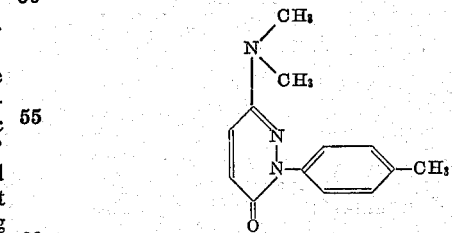

melts at 131–132° C.

The 2-(para-tolyl)-6-chloro-pyridazone-(3) used as starting material can be prepared as follows:

51 parts by weight of para-tolylhydrazine are refluxed for 2 hours with 41 parts by weight of maleic anhydride in 400 parts by volume of glacial acetic acid. The solution is then mixed with 200 parts by volume of water and the whole is allowed to stand for 15 hours for crystallisation to set in. It is then filtered and the residue dissolved in dilute caustic soda solution for purification and reprecipitated with hydrochloric acid. Finally, the precipitate is recrystallised from glacial acetic acid. The 2-(para-tolyl)-6-hydroxy-pyridazone-(3) thus obtained melts at 242–244° C.

88 parts by weight of this compound are heated to 100° C. for 1 hour with 600 parts by volume of phosphorus oxychloride. The excess phosphorus oxychloride is decomposed with dilute ice-cold caustic soda solution and the mixture extracted with ether. The ethereal solution is dried over potash, evaporated to dryness, and the residue recrystallised from methanol. The resulting 2-(para-tolyl)-6-chloro-pyridazone-(3) melts at 108–109° C.

Example 18

5.8 parts by weight of 6-dimethylamino-2-(para-nitrophenyl)-pyridazone-(3) are dissolved in 300 parts by volume of absolute ethanol and hydrogenated under atmospheric pressure at 40° C. in the presence of 2.5 parts by weight of Raney nickel. The solution is filtered off from the catalyst and evaporated in vacuo. The crystalline residue is dissolved in hot water, the solution filtered hot over animal charcoal and the filtrate cooled and suction-filtered. The slightly yellow 6-dimethylamino-2-(para-amino-phenyl)-pyridazone-(3) thus obtained has the formula

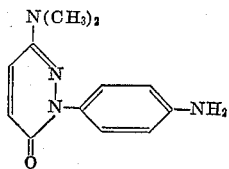

It melts at 170–172° C.

Its hydrochloride can be obtained as follows:

The free base is dissolved in ethyl alcoholic hydrochloric acid, the solution mixed with absolute ether and cooled. The crystallisate is suction-filtered, washed with ether and dried. It melts at 252–255° C. (with decomposition).

5.0 parts by weight of 6-dimethylamino-2-(p-aminophenyl)-pyridazone-(3) are heated to 110–120° C. for 6 hours in a closed vessel with 40 parts by volume of absolute alcohol, 7.7 parts by weight of methyl iodide and 1.3 parts by weight of sodium hydroxide. The reaction mixture is then evaporated in vacuo, taken up in water, rendered alkaline and extracted by agitation several times with chloroform. The chloroform solution is dried over sodium sulfate, filtered and evaporated. The dark brown oil which remains behind is suspended in hot water and caused to dissolve by the addition of alcohol. The solution is filtered with an addition of animal charcoal, cooled, and the yellow crystallisate suction-filtered, washed with water and dried.

The resulting 6-dimethylamino-2-(para-dimethylaminophenyl)-pyridazone-(3) of the formula

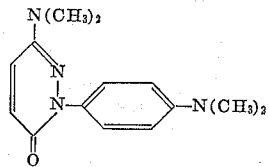

melts at 150–152° C.

Example 19

20 parts by weight of 2-phenyl-5:6-dichloro-pyridazone-(3) are heated to 200° C. for 2 days with 200 parts by volume of an ethanolic dimethylamine solution (of about 30 percent strength) in an autoclave. The reaction mass is evaporated to dryness, the residue extracted by agitation with water and ether, the ethereal extract is dried over potash, the ether evaporated and the oily residue treated with 100 parts by volume of 2 N-hydrochloric acid. There is thus obtained the crystalline, difficultly soluble monochlorhydrate of 5:6-bis-dimethylamino-2-phenyl-pyridazone-(3) of the formula

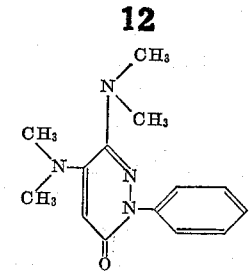

which is filtered off with suction and washed with acetone. In the crude state it melts at 201° C. and after recrystallisation from 2N-hydrochloric acid at 205.5° C. The free base is obtained by decomposing the chlorohydrate with soda solution and agitation with ether. For purification, the residue obtained on evaporating the ether is recrystallised several times from a mixture of 1 part by volume of benzene and 1 part by volume of cyclohexane. The melting point is at 132–134° C.

What is claimed is:

1. A member selected from the group consisting of compounds of the formula

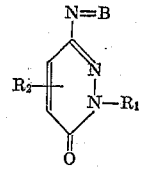

wherein the grouping -N=B stands for a member of the group consisting of amino, mono-lower alkyl-amino, di-lower alkyl-amino, pyrrolidino, piperidino and morpholino, the radical $R_1$ for a member of the group consisting of phenyl, halogeno-phenyl, lower alkyl-phenyl, nitro-phenyl, amino-phenyl, di-lower alkyl-amino-phenyl and naphthyl, and wherein $R_2$ represents a member of the group consisting of hydrogen, lower alkyl, amino, mono-lower alkyl-amino, di-lower alkyl-amino and piperidino, and salts thereof.

2. 6-di-lower alkyl-amino-2-phenyl-pyridazone-(3).
3. 6-lower alkyl-amino-2-phenyl-pyridazone-(3).
4. 6-dimethylamino-2-phenyl-pyridazone-(3).
5. 6-methylamino-2-phenyl-pyridazone-(3).
6. 6-morpholino-2-phenyl-pyridazone-(3).
7. 4,6-bis-dimethylamino-2-phenyl-pyridazone-(3).
8. 6 - dimethylamino - 2 - para - chlorophenyl - pyridazone-(3).

References Cited in the file of this patent

UNITED STATES PATENTS

| | | |
|---|---|---|
| 2,628,181 | Mowry | Feb. 10, 1953 |

FOREIGN PATENTS

| | | |
|---|---|---|
| 600,532 | Great Britain | Apr. 12, 1928 |
| 631,755 | Great Britain | Nov. 9, 1949 |
| 656,228 | Great Britain | Aug. 15, 1951 |

OTHER REFERENCES

Sonn et al.: Chem. Abstracts, vol. 29, page 5845 (1935).
Beilstein, vol. 24, pp. 79 and 83 (1936).
McElvain et al.: Chem. Abstracts, vol. 38, page 360 (1944).
Overend et al.: Chem. Abstracts, vol. 41, page 5527 (1947).
Simons: Ind. and Eng. Chem., vol. 39, p. 238 (1947).
Gregory et al.: Chem. Abstracts, vol. 44, page 3506 (1950).
Overend et al.: Chem. Abstracts, vol. 45, pp. 6640–41 (1951).